US012668177B2

(12) United States Patent
Kominato

(10) Patent No.: US 12,668,177 B2
(45) Date of Patent: Jun. 30, 2026

(54) CONTROL APPARATUS FOR A VEHICLE WITH A RETRACTABLE SPEAKER

(71) Applicant: SUBARU CORPORATION, Tokyo (JP)

(72) Inventor: Yuki Kominato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 24 days.

(21) Appl. No.: 18/923,819

(22) Filed: Oct. 23, 2024

(65) Prior Publication Data

US 2025/0153636 A1 May 15, 2025

(30) Foreign Application Priority Data

Nov. 13, 2023 (JP) .................................. 2023-192907

(51) Int. Cl.
*B60Q 5/00* (2006.01)
*B60R 11/00* (2006.01)
*B60R 11/02* (2006.01)
(52) U.S. Cl.
CPC .......... *B60Q 5/008* (2013.01); *B60R 11/0217* (2013.01); *B60R 2011/004* (2013.01); *B60R 2011/0092* (2013.01)
(58) Field of Classification Search
None
See application file for complete search history.

(56) References Cited

U.S. PATENT DOCUMENTS

2015/0343961 A1* 12/2015 Yu ........................... H04R 1/025
381/389
2020/0056909 A1* 2/2020 Datta Gupta ........ G01D 11/245

FOREIGN PATENT DOCUMENTS

JP 2019-166980 A 10/2019

* cited by examiner

*Primary Examiner* — Madison R. Inserra
(74) *Attorney, Agent, or Firm* — Rimon P.C.

(57) ABSTRACT

A control apparatus for a vehicle includes a speaker, a first bracket, a second bracket, an engagement mechanism, a vehicle collision detector, and a vehicle processor. The speaker is configured to output a notification sound that notifies surroundings of an approach of the vehicle. The first bracket holds the speaker. The second bracket movably supports the first bracket and is configured to be fixed to the vehicle. The engagement mechanism detachably engages the first bracket and the second bracket. The vehicle collision detector is configured to detect a collision of the vehicle. The vehicle processor is configured to move the engagement mechanism, based on a detection signal of the vehicle collision detector. The vehicle processor is configured to, in response to an input of the detection signal, move the engagement mechanism, and release the engagement of the first and second brackets and move the first bracket toward the inside of the vehicle.

6 Claims, 8 Drawing Sheets

CONTROL APPARATUS FOR A VEHICLE WITH A RETRACTABLE SPEAKER

CROSS-REFERENCE TO RELATED APPLICATIONS

The present application claims priority from Japanese Patent Application No. 2023-192907 filed on Nov. 13, 2023, the entire contents of which are hereby incorporated by reference.

BACKGROUND

The disclosure relates to a control apparatus for a vehicle which controls a holding position of a speaker that notifies the surroundings of an approach of the vehicle.

In recent years, there are vehicles travelable without using an engine, such as an electric vehicle or a hybrid vehicle. These vehicles do not output an engine sound, making it difficult for a person such as a pedestrian to recognize the approach of the vehicle by the engine sound of the vehicle.

At present, the vehicles travelable without using the engine such as the electric vehicle or the hybrid vehicle are being legally regulated in many countries so as to notify a person such as the pedestrian of the approach of the vehicle by outputting a notification sound. In addition, the notification sound to be outputted from the vehicle travelable without using the engine is to include a sound pressure equal to or higher than a specified value.

Japanese Unexamined Patent Application Publication (JP-A) No. 2019-166980 discloses a vehicle acoustic apparatus. The vehicle acoustic apparatus includes a speaker attached to a vehicle and a drive device that rotates the speaker. The speaker is disposed inside a recess of a storage part of a bumper beam. The drive device switches between: a transmission state in which the speaker is directed toward an opening side on a front side of the vehicle inside the recess; and a standby state in which the speaker is directed toward a side wall of the storage part inside the recess.

The speaker of the vehicle acoustic apparatus can be disposed inside the recess via a bracket attached to a bottom surface inside the recess. In this case, application of an impact to the bracket upon a collision of the vehicle deforms a fragile part of the bracket, moving the speaker toward a rear side of the vehicle. This reduces a contact of the speaker with a collision object such as another vehicle and a damage to the speaker accordingly.

SUMMARY

An aspect of the disclosure provides a control apparatus for a vehicle. The control apparatus includes a speaker, a first bracket, a second bracket, an engagement mechanism, a vehicle collision detector, and a vehicle processor. The speaker is configured to output a notification sound that notifies surroundings of an approach of the vehicle. The first bracket holds the speaker. The second bracket movably supports the first bracket and is configured to be fixed to the vehicle. The engagement mechanism detachably engages the first bracket and the second bracket with each other. The vehicle collision detector is configured to detect a collision of the vehicle. The vehicle processor is configured to move the engagement mechanism, based on a detection signal of the vehicle collision detector. The vehicle processor is configured to, in response to an input of the detection signal of the vehicle collision detector, move the engagement mechanism, and release the engagement of the first bracket and the second bracket and move the first bracket toward the inside of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
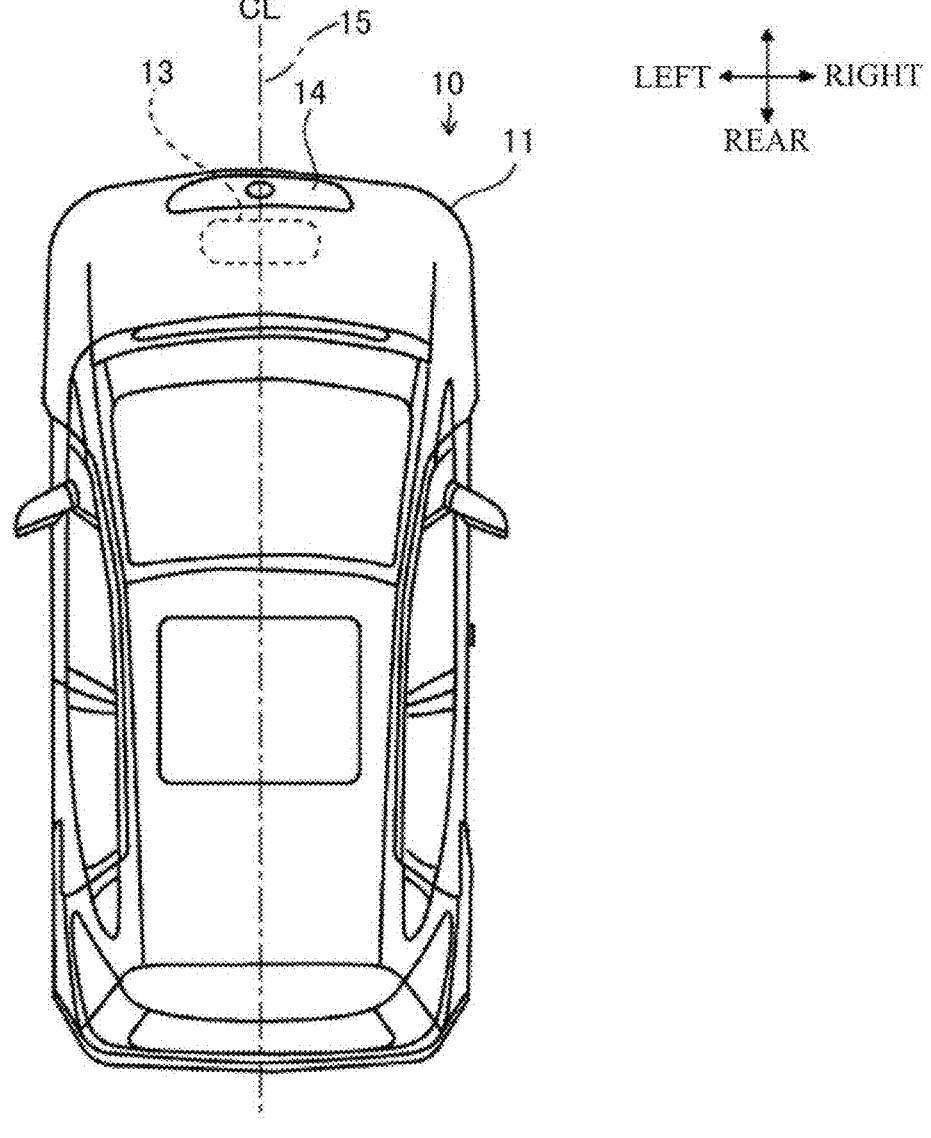
FIG. 1 is a plan diagram illustrating a vehicle in which a control apparatus for a vehicle according to one example embodiment of the disclosure is disposed.

A speaker of a vehicle acoustic apparatus disclosed in JP-A No. 2019-166980 is disposed inside a recess of a storage part via a bracket to be movable toward a rear side of a vehicle inside the recess upon a collision of the vehicle. Depending on a situation of the collision, such as a direction of the collision of the vehicle, however, a deformation shape of the bracket can become unstable, which makes an amount of movement of the speaker toward the rear side of the vehicle becomes insufficient, which in turn can damage the speaker. In addition, when one side of the bracket in a vehicle width direction is deformed, the speaker can collide with a side wall inside the recess and can be damaged.

Further, a transmission state of the vehicle acoustic apparatus disclosed in JP-A No. 2019-166980 can involve difficulties in moving the speaker more toward a front side than the inside of the recess of the storage part of a bumper beam. This structure thus suffers from an increase in a notification sound to be outputted from the speaker in order to deliver the notification sound equal to or higher than a specified value to a person such as a pedestrian around the vehicle. This also results in an increase in the volume of the notification sound entering a vehicle compartment, making it difficult to achieve quietness in the vehicle compartment.

It is desirable to provide a control apparatus for a vehicle which moves the speaker toward the inside of the vehicle upon a collision of the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In addition, a front-rear direction of the paper surface of the drawings indicates a longitudinal direction of a vehicle 11, a right-left direction of the paper surface indicates a vehicle width direction of the vehicle 11, and an up-down direction of the paper surface indicates a height direction of the vehicle 11.

Figure 2:
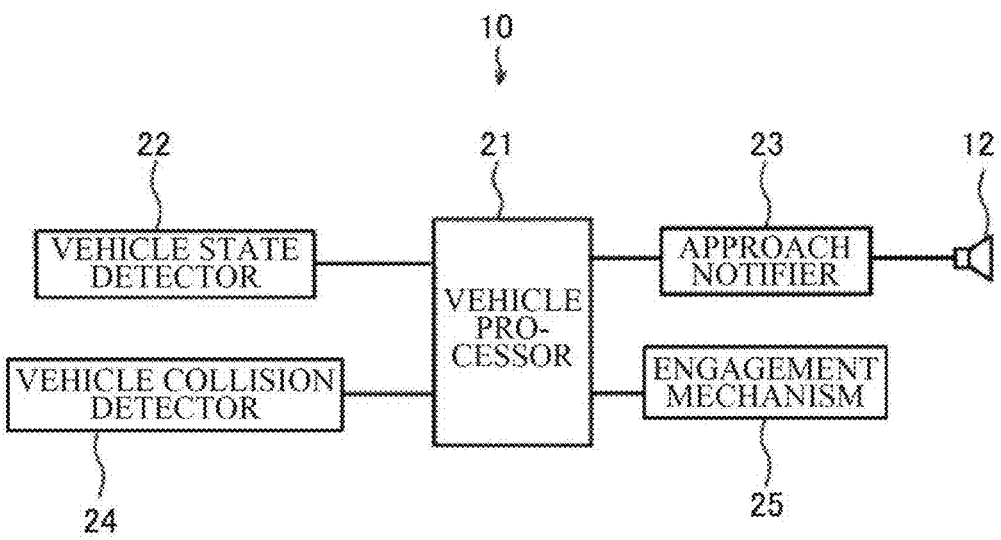
FIG. 2 is a block diagram illustrating the control apparatus for the vehicle illustrated in FIG. 1.
Figures 3A, 3B:
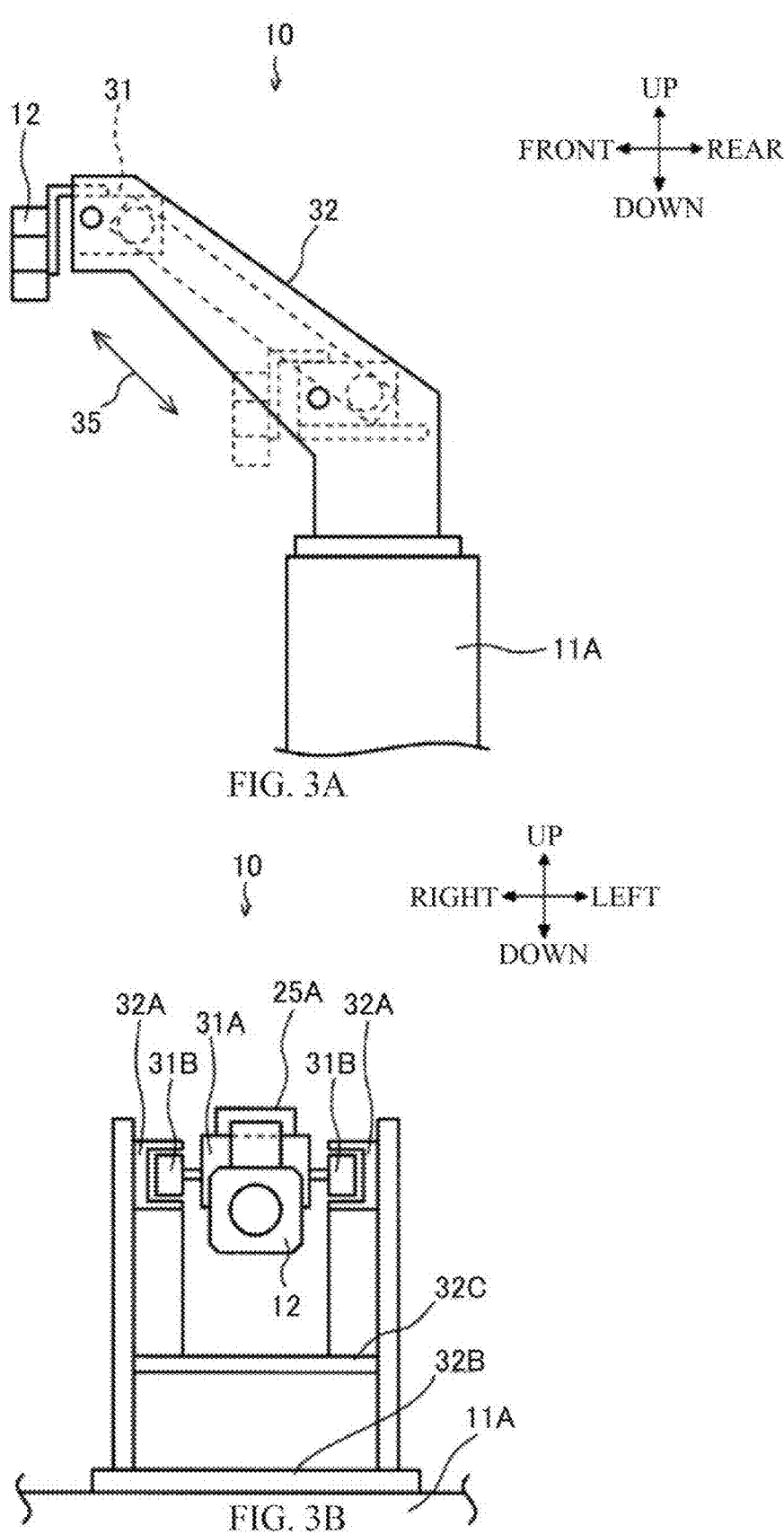
FIG. 3A is a side diagram illustrating the control apparatus for the vehicle illustrated in FIG. 1.
FIG. 3B is a side diagram illustrating the control apparatus for the vehicle illustrated in FIG. 1.
Figure 3C:
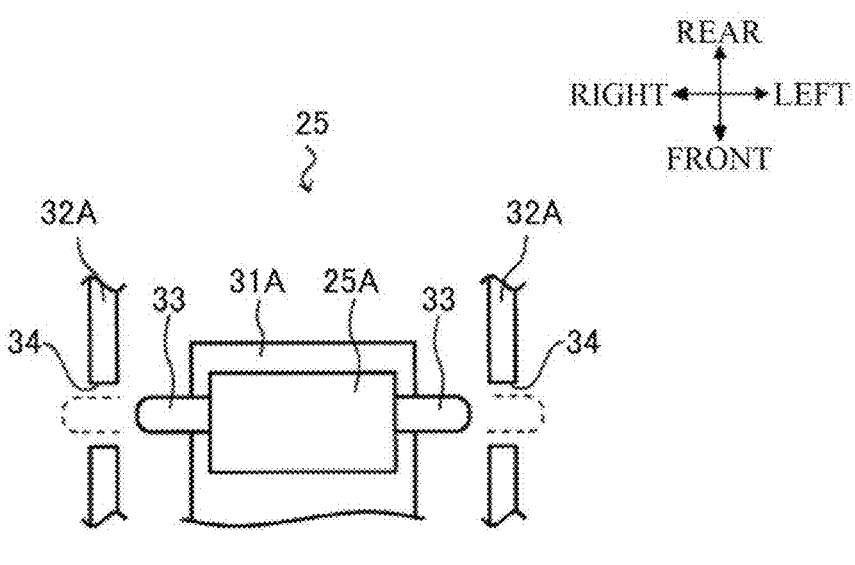
FIG. 3C is a plan diagram illustrating the control apparatus for the vehicle illustrated in FIG. 1.

FIG. 1 is a plan diagram illustrating the vehicle 11 in which a control apparatus for a vehicle 10 (hereinafter simply referred to as a vehicle control apparatus 10) according to an example embodiment of the disclosure is disposed. FIG. 2 is a block diagram illustrating the vehicle control apparatus 10 illustrated in FIG. 1. FIG. 3A is a side diagram illustrating a holding structure of a speaker 12 of the vehicle control apparatus 10 illustrated in FIG. 1. FIG. 3B is a side diagram illustrating the holding structure of the speaker 12 of the vehicle control apparatus 10 illustrated in FIG. 1. FIG. 3C is a plan diagram illustrating an engagement mechanism 25 of the vehicle control apparatus 10 illustrated in FIG. 1.

Referring to FIG. 1, the vehicle 11 may be an electric vehicle such as a battery electric vehicle (BEV), a hybrid electric vehicle (HEV), or a plug-in hybrid electric vehicle (PHEV).

For example, according to Japanese laws and regulations, the vehicle 11 travelable without using an engine is to output a sound pressure equal to or higher than a specified value in two frequency bands within a frequency band in which a frequency from 160 Hz to 5 kHz is divided by 16 every ⅓ octave from the start of the vehicle 11 to a speed of 20 km/h.

The vehicle control apparatus 10 according to the example embodiment includes the speaker 12 as a notifier that notifies the surroundings of the vehicle 11 of a notification sound, as illustrated in FIG. 2. In one example, as indicated by a region surrounded by a dotted line 13, the speaker 12 may be disposed at a front part of the vehicle 11 within a tuft between a front grille 14 and an unillustrated radiator. A dashed-dotted line 15 indicates a center line CL of the vehicle 11 in the vehicle width direction. The speaker 12 may be disposed on the center line CL of the vehicle 11 and disposed toward a front side of the vehicle 11.

Referring to FIG. 2, the vehicle control apparatus 10 includes a vehicle processor 21, the speaker 12, a vehicle collision detector 24, a first bracket 31, a second bracket 32, and the engagement mechanism 25. The first bracket 31 holds the speaker 12 as illustrated in FIG. 3A. The second bracket 32 movably supports the first bracket 31 as illustrated in FIG. 3A. In some embodiments, the vehicle control apparatus 10 may further include a vehicle state detector 22 and an approach notifier 23.

The vehicle processor 21 may include devices including, for example but not limited to, a central processing unit (CPU), a read-only memory (ROM), and a random-access memory (RAM). In some embodiments, the vehicle processor 21 may be an electronic control unit (ECU) having one or more processors that execute, for example, various operations to control an unillustrated device of the vehicle 11, such as a drive device. Non-limiting examples of the drive device may include a motor.

The vehicle processor 21 may include an unillustrated storage. The storage may be a nonvolatile memory such as an electrically erasable programmable read-only memory (EEPROM). The storage may store: various pieces of data necessary for an operation to be performed by the vehicle processor 21; and one or more programs executable by the one or more processors.

The vehicle state detector 22 may be a sensor that detects a traveling state of the vehicle 11. Non-limiting examples of the vehicle state detector 22 may include a vehicle speed sensor. The vehicle speed sensor may detect a speed of the vehicle 11 and output a detection signal to the vehicle processor 21. Based on the detection signal, the vehicle processor 21 may determine whether the traveling state of the vehicle 11 is a state in which the notification sound is to be outputted in accordance with applicable laws and regulations.

The approach notifier 23 may be a device such as an amplifier. The approach notifier 23 may convert sound data of the notification sound into a sound signal and output the sound signal to the speaker 12, when a control signal indicating that the notification sound is to be outputted is received from the vehicle processor 21. In some embodiments, the speaker 12 may be a dynamic speaker. The speaker 12 may output the notification sound to the outside of the vehicle 11, based on the sound signal received from the approach notifier 23. The unillustrated storage of the approach notifier 23 may store the sound data of the notification sound that satisfies requirements of the applicable laws and regulations.

The vehicle collision detector 24 may be provided between a bumper face and the bumper beam of the vehicle 11 in the vehicle width direction. The vehicle collision detector 24 may include an impact absorber and a collision detector. The unillustrated impact absorber may include a foamed resin material such as foamed polypropylene or a resin material such as polypropylene. The impact absorber may be continuously provided from a left end side of the vehicle 11 to a right end side of the vehicle 11.

The collision detector may be disposed inside the front of the impact absorber, and have a substantially tubular shape. The collision detector may so deform as to be crushed when a collision such as a pedestrian collision or a vehicle collision occurs. Detection devices respectively disposed at both ends of the collision detector may detect the collision of the vehicle 11 by sensing an amount of deformation of the collision detector. The vehicle collision detector 24 may output a detection signal to the vehicle processor 21.

The engagement mechanism 25 may have an engagement pin 33 and an engagement receiving hole 34. The engagement pin 33 may be movable by an unillustrated solenoid. The engagement receiving hole 34 may be provided on the second bracket 32. The engagement mechanism 25 is controlled by the vehicle processor 21. The vehicle processor 21 releases an engagement of the engagement mechanism 25, based on the detection signal received from the vehicle collision detector 24.

As will be described in detail later, the engagement mechanism 25 fixes the first bracket 31 that holds the speaker 12 to the second bracket 32 to be in engagement with each other. The engagement mechanism 25 releases the engagement of the first bracket 31 and the second bracket 32 upon the collision of the vehicle 11. This configuration may allow the first bracket 31 to be guided by the second bracket 32 and moved toward a rear side of the vehicle 11, thus preventing the speaker 12 from being damaged by the vehicle collision. The example configurations of the first bracket 31, the second bracket 32, and the engagement mechanism 25 will be described later with reference to FIGS. 3A to 3C.

Referring to FIGS. 3A and 3B, the first bracket 31 may have a body 31A and a pair of wheels 31B disposed in the vehicle width direction of the body 31A. The speaker 12 may be fixed to a front surface of the body 31A of the first bracket 31.

The second bracket 32 may include: a pair of rails 32A; a base 32B that supports the pair of rails 32A; and a stopper 32C that is so disposed as to bridge the pair of rails 32A. The second bracket 32 may be fixed to an upper surface of a vehicle body frame 11A by bolting the base 32B. The rail 32A may have a substantially U-shaped cross-section in an extending direction of the rail 32A. The wheel 31B of the first bracket 31 may be disposed toward an inner side of rail 32A.

As illustrated in FIGS. 3A and 3B, the rail 32A of the second bracket 32 may extend upward with respect to the vehicle body frame 11A toward an obliquely front side of the vehicle 11. As indicated by an arrow 35, the wheel 31B of the first bracket 31 may slide on the inner side of the rail 32A by its own weight, by which the wheel 31B is movable toward the rear side of the vehicle 11. The movement of the wheel 31B may be stopped when the wheel 31B reaches the stopper 32C, preventing the body 31A from colliding with the vehicle body frame 11A.

As illustrated in FIG. 3C, the engagement mechanism 25 may include: a housing 25A; the unillustrated solenoid disposed inside the housing 25A; and the engagement pin 33 movable by the solenoid. The housing 25A of the engagement mechanism 25 may be fixed to an upper surface of the body 31A of the first bracket 31. The rail 32A of the second bracket 32 may have the engagement receiving hole 34 that comes into engagement with the engagement pin 33.

With this configuration, the first bracket 31 may be fixed in the vicinity of an end of the rail 32A of the second bracket 32. The end of the rail 32A may extend to the periphery of the front grille 14 of the vehicle 11 as illustrated in FIG. 1, allowing the speaker 12 to be also disposed in the periphery of the front grille 14. This configuration helps to easily deliver the notification sound outputted from the speaker 12 to a target such as the pedestrian around the vehicle 11. In addition, the notification sound is not outputted from the speaker 12 at an unnecessary volume, reducing the notification sound that enters the vehicle compartment of the vehicle 11, which helps to achieve quietness in the vehicle compartment.

When the vehicle 11 collides with an object such as another vehicle, the pedestrian, or an obstacle, the vehicle collision detector 24 may detect the collision and output the detection signal to the vehicle processor 21. The vehicle processor 21 may so move the engagement pin 33 that the engagement pin 33 is disengaged from the engagement receiving hole 34, based on the detection signal received from the vehicle collision detector 24.

This configuration allows the first bracket 31 to be guided by a downwardly inclined structure of the rail 32A of the second bracket 32 and is moved toward the rear side of the vehicle 11 by its own weight. This configuration in turn allows the first bracket 31 to be retracted to the inside of the vehicle 11 before a member such as the front bumper of the vehicle 11 enters the tuft of the vehicle 11, which helps to prevent the speaker 12 from colliding with a member such as the front bumper and being damaged. In recent years, the quality of the speaker 12 has been enhanced. This configuration also helps to prevent an increase in a burden to be imposed on a user due to the damage of the speaker 12.

In some embodiments, the second bracket 32 may include a material having a higher rigidity than the first bracket 31, such as a steel plate. This makes it difficult for the second bracket 32 to be greatly deformed even if the second bracket 32 collides with a member such as the front bumper. The speaker 12 fixed to the first bracket 31 may be protected by the second bracket 32 by being retracted to the inner side of the rail 32A of the second bracket 32, which helps to make it further difficult for the speaker 12 to be damaged.

In some embodiments, the first bracket 31 may slide down the downwardly inclined structure of the rail 32A of the second bracket 32. The wheel 31B is not limited to the wheel structure. In some embodiments, any structure slidable down the rail 32A may be employed.

Figure 4:
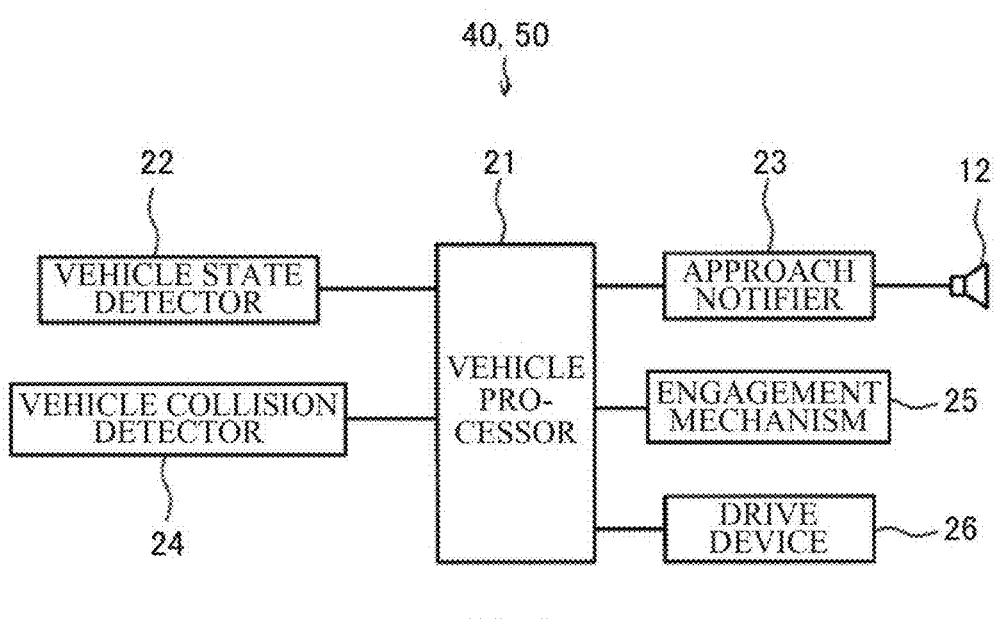
FIG. 4 is a block diagram illustrating a control apparatus for the vehicle according to one example embodiment of the disclosure.
Figure 5A:
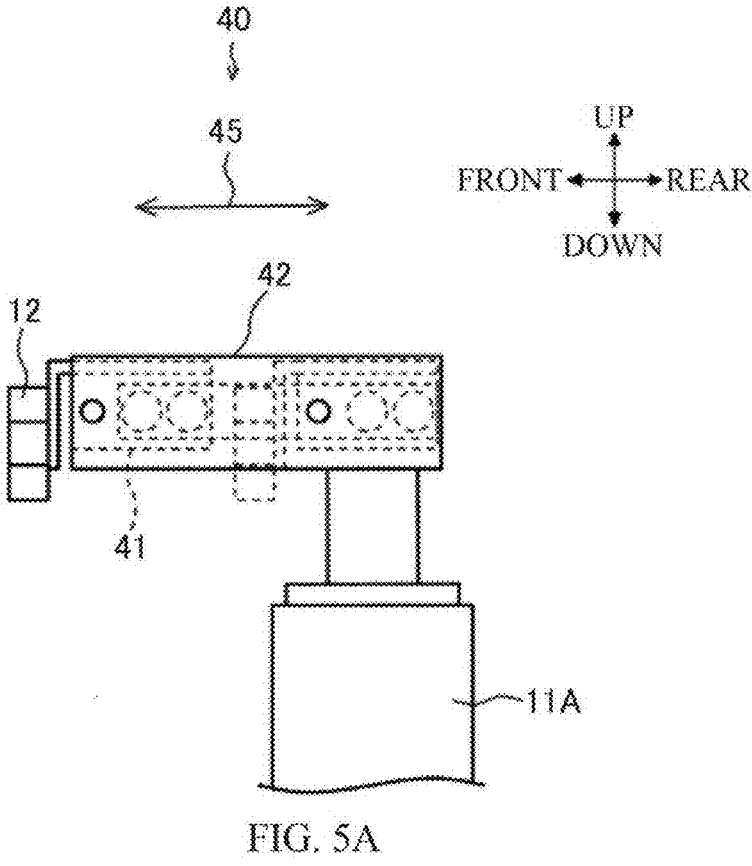
FIG. 5A is a side diagram illustrating the control apparatus for the vehicle illustrated in FIG. 4.
Figure 5B:
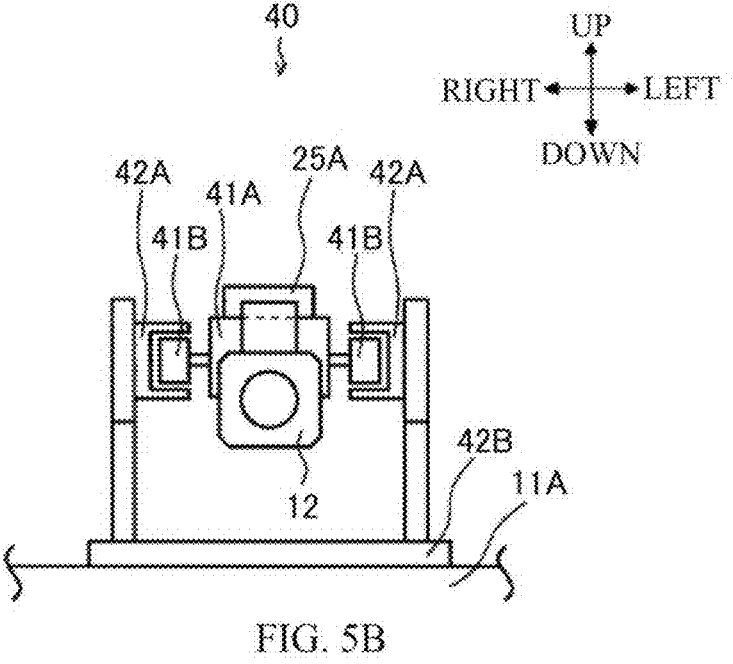
FIG. 5B is a side diagram illustrating the control apparatus for the vehicle illustrated in FIG. 4.
Figure 5C:
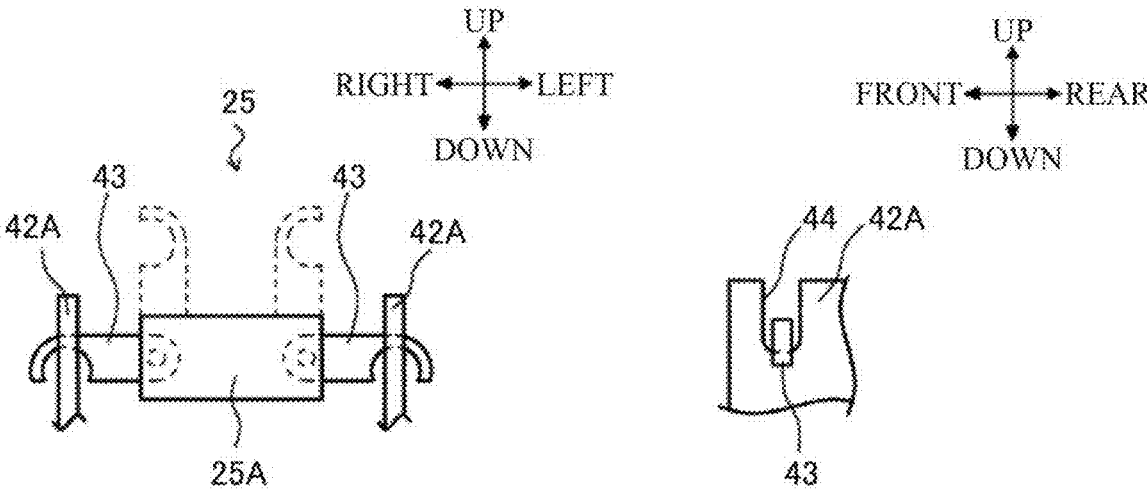
FIG. 5C is a side diagram illustrating the control apparatus for the vehicle illustrated in FIG. 4.
Figure 6A:
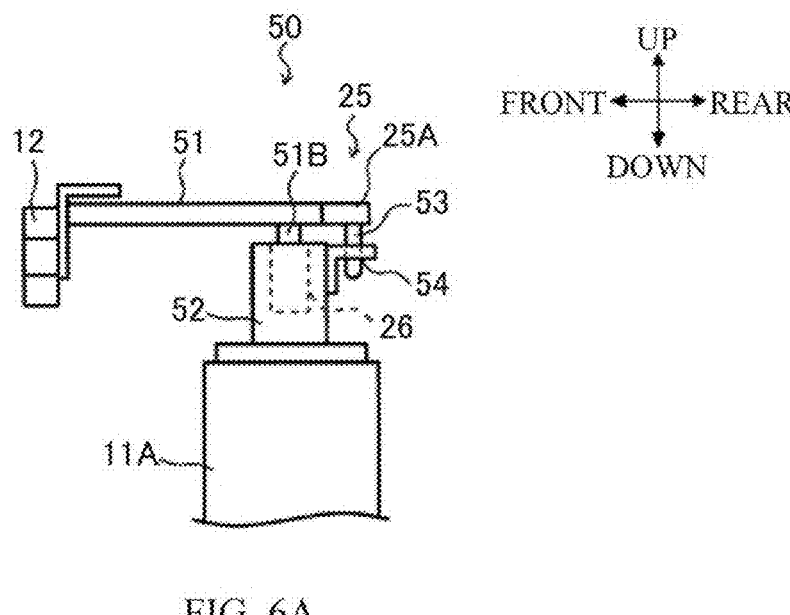
FIG. 6A is a side diagram illustrating the control apparatus for the vehicle illustrated in FIG. 4.
Figure 6B:
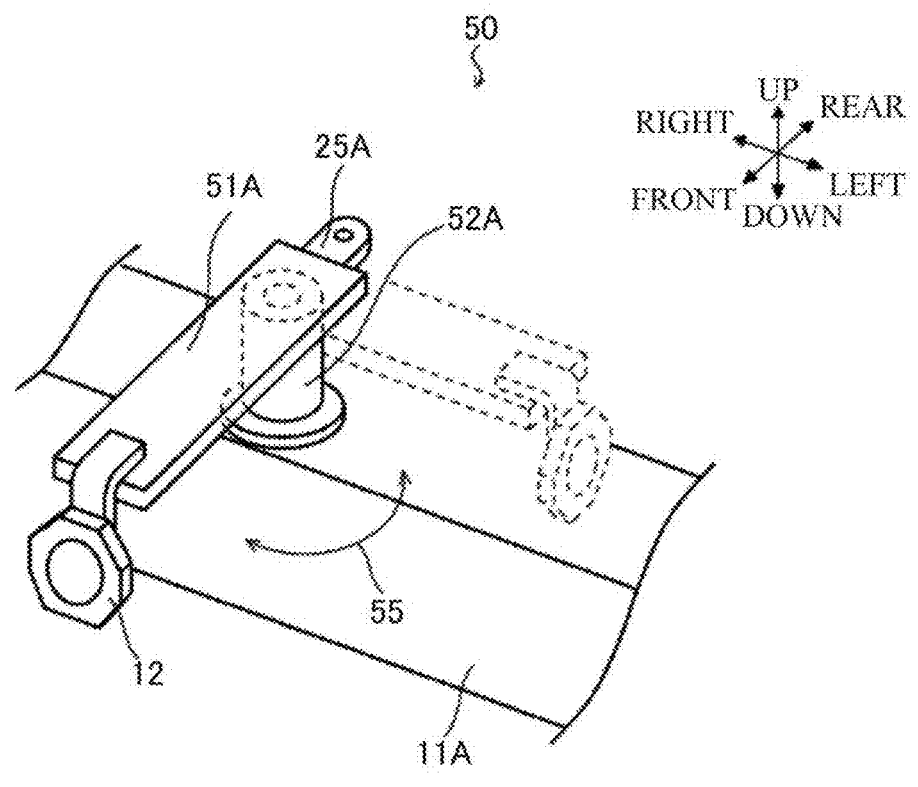
FIG. 6B is a perspective diagram illustrating the control apparatus for the vehicle illustrated in FIG. 4.

Next, modification examples of the vehicle control apparatus 10 according to the example embodiment will be described with reference to FIG. 4 to FIG. 6B. Although an example embodiment in which the first bracket 31 slides by its own weight with respect to the second bracket 32 has been described with reference to FIGS. 3A and 3B, the disclosure is not limited thereto. In some embodiments, a first bracket 41 of a vehicle control apparatus 40 may move by itself with respect to a second bracket 42 by a drive device 26 as illustrated in FIGS. 5A to 5C. In some embodiments, a first bracket 51 of a vehicle control apparatus 50 may rotate with respect to a second bracket 52 by the drive device 26 as illustrated in FIGS. 6A and 6B.

In the following description of the vehicle control apparatuses 40 and 50, the same components as those of the vehicle control apparatus 10 described with reference to FIGS. 1 to 3C are denoted by the same reference numerals, and repeated description thereof will be omitted. FIG. 4 is a block diagram illustrating the vehicle control apparatuses 40 or 50 according to an example embodiment of the disclosure. FIG. 5A is a side diagram illustrating a holding structure of the speaker 12 of the vehicle control apparatus 40 illustrated in FIG. 4. FIG. 5B is a side diagram illustrating the holding structure of the speaker 12 of the vehicle control apparatus 40 illustrated in FIG. 4. FIG. 5C is a plan diagram illustrating the engagement mechanism 25 of the vehicle control apparatus 40 illustrated in FIG. 4. FIG. 6A is a perspective diagram illustrating a holding structure of the speaker 12 of the vehicle control apparatus 50 illustrated in FIG. 4. FIG. 6B is a side diagram illustrating the holding structure of the speaker 12 of the vehicle control apparatus 50 illustrated in FIG. 4.

Referring to FIG. 4, the vehicle control apparatus 40 or 50 includes the vehicle processor 21, the speaker 12, the vehicle collision detector 24, the first bracket 41 or 51, the second bracket 42 or 52, the engagement mechanism 25, and the drive device 26. The first bracket 41 or 51 holds the speaker 12 as illustrated in FIG. 5A or FIG. 6A. The second bracket 42 or 52 movably supports the first bracket 41 or 51 as illustrated in FIG. 5A. The drive device 26 drives the first bracket 41 or 51. In some embodiments, the vehicle control apparatus 40 or 50 may further include the vehicle state detector 22 and the approach notifier 23.

In some embodiments, the drive device 26 may be an electric motor. The drive device 26 may be controlled by the vehicle processor 21 to drive or stop. The drive device 26 of the vehicle control apparatus 40 may be disposed inside a body 41A of the first bracket 41, coupled to an axle of a wheel 41B of the first bracket 41, and rotate the wheel 41B. The drive device 26 of the vehicle control apparatus 50 may be disposed in the second bracket 52, coupled to a rotating shaft 51B of the first bracket 51, and rotate the first bracket 51.

Referring to FIGS. 5A and 5B, the first bracket 41 may have: a body 41A, a pair of wheels 41B disposed in the vehicle width direction of the body 41A, and the drive device 26 disposed inside the body 41A. The speaker 12 may be fixed to a front surface of the body 41A of the first bracket 41.

The second bracket 42 may include: a pair of rails 42A; and a base 42B that supports the pair of rails 42A. The second bracket 42 may be fixed to an upper surface of the vehicle body frame 11A by bolting the base 42B. The rail 42A may have a substantially U-shaped cross-section in an extending direction of the rail 42A. The wheel 41B of the first bracket 41 may be disposed toward an inner side of the rail 42A.

As illustrated in FIGS. 5A and 5B, the rail 42A of the second bracket 42 may be substantially horizontal with respect to the vehicle body frame 11A, and extend toward the front side of the vehicle 11. As indicated by an arrow 45, the wheel 41B of the first bracket 41 may be driven by the drive device 26 to move by itself on an inner side of the rail 42A and be movable toward the rear side of the vehicle 11. The drive device 26 may be controlled by the vehicle processor 21 and stopped at a desired position on the rail 42A, thereby preventing the body 41A from colliding with the vehicle body frame 11A.

As illustrated in FIG. 5C, the engagement mechanism 25 may include: the housing 25A; the unillustrated solenoid disposed inside the housing 25A; and an engagement hook 43 movable by the solenoid. The housing 25A of the engagement mechanism 25 may be fixed to an upper surface of the body 41A of the first bracket 41. The rail 42A of the second bracket 42 may have an engagement receiving groove 44 that comes into engagement with the engagement hook 43.

With this configuration, the first bracket 41 may be fixed in the vicinity of an end of the rail 42A of the second bracket 42. The speaker 12 may also be disposed in the periphery of the front grille 14. Thus, it is possible for the vehicle control apparatus 40 to achieve example effects similar to those of the vehicle control apparatus 10 as well. In addition, the vehicle control apparatus 40 may achieve any other effect as well.

When the vehicle 11 collides with an object such as another vehicle, the pedestrian, or the obstacle, the vehicle collision detector 24 may detect the collision and output the detection signal to the vehicle processor 21. The vehicle processor 21 may so move the engagement hook 43 that the engagement hook 43 is disengaged from the engagement receiving groove 44, based on the detection signal received from the vehicle collision detector 24. In addition, the vehicle processor 21 may drive the drive device 26, allowing the first bracket 41 to move by itself with respect to the second bracket 42, and the speaker 12 may be retracted toward the rear side of the vehicle 11. Thus, it is possible for the vehicle control apparatus 40 to achieve example effects similar to those of the vehicle control apparatus 10 as well. In addition, the vehicle control apparatus 40 may achieve any other effect as well.

In some embodiments, the second bracket 42 may include a material having a higher rigidity than the first bracket 41, such as a steel plate. Thus, it is possible for the vehicle control apparatus 40 to achieve example effects similar to those of the vehicle control apparatus 10 as well. In addition, the vehicle control apparatus 40 may achieve any other effect as well.

Referring to FIGS. 6A and 6B, the first bracket 51 may have: a body 51A; and the rotating shaft 51B provided on a rear end side of the body 51A. The speaker 12 may be fixed to a front surface of the body 51A of the first bracket 51. The second bracket 52 may include: a base 52A; and the drive device 26 disposed on an upper end side of the base 52A. The rotating shaft 51B may be coupled to the drive device 26, allowing the first bracket 51 to be rotatable with respect to the second bracket 52.

As illustrated in FIGS. 6A and 6B, the engagement mechanism 25 may include: the housing 25A; the unillustrated solenoid disposed inside the housing 25A; and an engagement pin 53 movable by the solenoid. The housing 25A of the engagement mechanism 25 may be fixed to a rear end of the body 51A of the first bracket 51. The base 52A of the second bracket 52 may have an engagement receiving hole 54 that is provided in the vicinity of an upper end of the base 52A and that comes into engagement with the engagement pin 53.

With this configuration, the first bracket 51 may be fixed to an upper end of the second bracket 52 and extend on the center line CL of the vehicle 11 toward the front side of the vehicle 11. The speaker 12 may be disposed in the vicinity of the front grille 14. Thus, it is possible for the vehicle control apparatus 50 to achieve example effects similar to those of the vehicle control apparatus 10 as well. In addition, the vehicle control apparatus 50 may achieve any other effect as well.

When the vehicle 11 collides with an object such as another vehicle, the pedestrian, or an obstacle, the vehicle collision detector 24 may detect the collision and output the detection signal to the vehicle processor 21. The vehicle processor 21 may so move the engagement pin 53 that the engagement pin 53 is disengaged from the engagement receiving hole 54, based on the detection signal received from the vehicle collision detector 24. In addition, as indicated by an arrow 55, the vehicle processor 21 may drive the drive device 26, allowing the first bracket 51 to rotate with respect to the second bracket 52, and the speaker 12 may be retracted toward the rear side of the vehicle 11. Thus, it is possible for the vehicle control apparatus 50 to achieve example effects similar to those of the vehicle control apparatus 10 as well. In addition, the vehicle control apparatus 50 may achieve any other effect as well.

In the vehicle control apparatus 10, 40, or 50 of the example embodiment, the speaker 12 may be disposed at the front part of the vehicle 11, and the first bracket 31, 41, or 51 may be moved toward the rear side of the vehicle 11 to protect the speaker 12 when an obstruct such as another vehicle collides with the front part of the vehicle 11. The rear side of the vehicle 11 may be the inside of the vehicle 11. The disclosure, however, is not limited thereto. In some embodiments, the first bracket 31, 41, or 51 may be moved toward the front side of the vehicle 11 to protect the speaker 12, when the speaker 12 is disposed at a rear part of the vehicle 11 and an obstacle such as another vehicle collides with the rear part of the vehicle 11. The front side of the vehicle 11 may be the inside of the vehicle 11. In some embodiments, when an obstacle collides with a side of the vehicle 11, the vehicle collision detector 24 may detect the collision and output the detection signal to the vehicle processor 21 to protect the speaker 12.

The structure of the vehicle collision detector 24 of the vehicle control apparatus 10, 40, or 50 is exemplary and non-limiting, and various structures is adoptable. In addition, various modifications may be made without departing from the inventive concept of the disclosure.

A control apparatus for a vehicle according to at least one embodiment of the disclosure includes a speaker configured to output a notification sound that notifies the surroundings of an approach of the vehicle, and the speaker is held by a first bracket. When a vehicle collision detector detects a collision with the vehicle, a vehicle processor is configured to retract the speaker held by the first bracket toward the inside of the vehicle via a second bracket. This structure makes it difficult for the speaker to be damaged by the collision with the vehicle. In addition, the speaker is held in the vicinity of a member such as a front bumper or a front grille by the first bracket upon an event such as traveling of the vehicle, which helps to easily deliver the notification sound to a target such as a pedestrian around the vehicle.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The vehicle processor 21 illustrated in FIGS. 1 and 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle processor 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle processor 21 illustrated in FIGS. 1 and 4.

The invention claimed is:

1. A control apparatus for a vehicle, the control apparatus comprising:
   a speaker configured to output a notification sound that notifies surroundings of an approach of the vehicle;
   a first bracket that holds the speaker;
   a second bracket that movably supports the first bracket, is configured to be fixed to the vehicle, and comprises a rail along which the first bracket is configured to move;
   an engagement mechanism that detachably engages the first bracket and the second bracket with each other;
   a vehicle collision detector configured to detect a collision of the vehicle; and
   a vehicle processor configured to move the engagement mechanism, based on a detection signal of the vehicle collision detector, wherein
   the rail comprises a downwardly inclined structure directed toward the inside of the vehicle, and
   the vehicle processor is configured to, in response to an input of the detection signal of the vehicle collision detector, move the engagement mechanism to release the engagement of the first bracket and the second bracket, such that the first bracket moves toward the inside of the vehicle by its own weight along the rail.

2. The control apparatus according to claim 1, wherein the engagement mechanism comprises a housing, a solenoid disposed inside the housing, and a movable engagement member, and
   the second bracket comprises an engagement receiving portion configured to come into engagement with the engagement member.

3. The control apparatus according to claim 1, wherein the second bracket includes a material having a higher rigidity than the first bracket.

4. A control apparatus for a vehicle, the control apparatus comprising:
   a speaker configured to output a notification sound that notifies surroundings of an approach of the vehicle;
   a first bracket that holds the speaker;
   a second bracket that movably supports the first bracket, is configured to be fixed to the vehicle, and comprises a rail along which the first bracket is configured to move;
   an engagement mechanism that detachably engages the first bracket and the second bracket with each other;
   a vehicle collision detector configured to detect a collision of the vehicle; and
   a vehicle processor is configured to move the engagement mechanism, based on a detection signal of the vehicle collision detector, wherein
   the first bracket comprises:
      a wheel configured to move along the rail; and
      a drive device configured to drive the wheel, and
   the vehicle processor is configured to, in response to an input of the detection signal of the vehicle collision detector, move the engagement mechanism to release the engagement of the first bracket and the second bracket, and drive the wheel by the drive device to move the first bracket along the rail.

5. The control apparatus according to claim 4, wherein the engagement mechanism comprises a housing, a solenoid disposed inside the housing, and a movable engagement member, and the second bracket comprises an engagement receiving portion configured to come into engagement with the engagement member.

6. The control apparatus according to claim 4, wherein the second bracket includes a material having a higher rigidity than the first bracket.

* * * * *